United States Patent [19]
Witte

[11] 3,779,565
[45] Dec. 18, 1973

[54] COMPOSITE EXPANSIBLE BIASING AND SEALING GASKET

[75] Inventor: Walter R. Witte, Des Plaines, Ill.

[73] Assignee: Speco, Inc., Schiller Park, Ill.

[22] Filed: Mar. 6, 1972

[21] Appl. No.: 231,909

[52] U.S. Cl. .............................. 277/123, 277/235 R
[51] Int. Cl. ............................................... F16j 15/12
[58] Field of Search................ 241/82.5, 82.6, 82.7, 241/DIG. 32; 267/152; 277/164, 235 R, 235 A, 123

[56] References Cited
UNITED STATES PATENTS

| 3,542,104 | 11/1970 | Anderson | 241/82.5 |
| 3,532,350 | 10/1970 | Kaufman | 277/235 |
| 3,625,501 | 12/1971 | Hein | 267/152 |
| 1,971,491 | 8/1934 | Laemmel | 241/82.5 |

FOREIGN PATENTS OR APPLICATIONS

| 514,307 | 12/1930 | Germany | 241/82.5 |

*Primary Examiner*—Donald G. Kelly
*Attorney*—Norman H. Gerlach

[57] ABSTRACT

A meat grinder characterized by the provision of a novel expansible, spring-assisted biasing and sealing gasket for urging the non-rotatable perforated shear plate against the rotary cutter including an intermediate resilient member sandwiched between outer rigid members and a series of springs disposed in the intermediate member and compressed between the rigid members.

2 Claims, 8 Drawing Figures

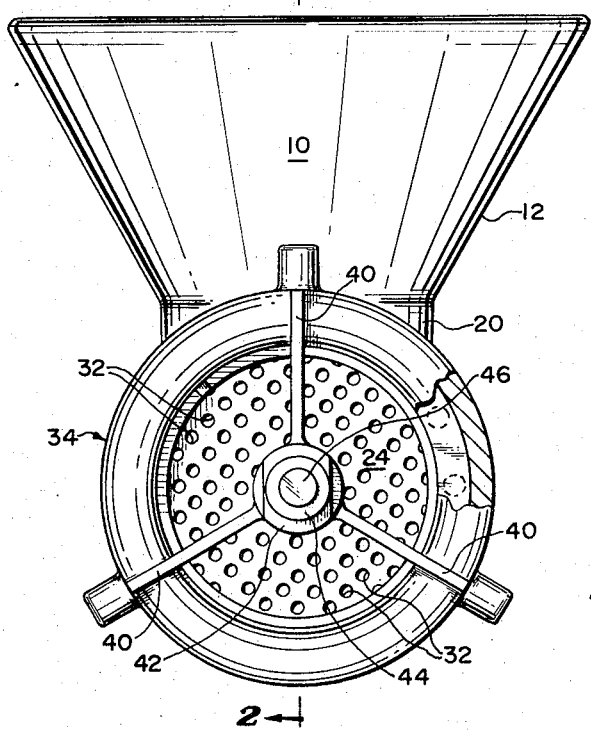
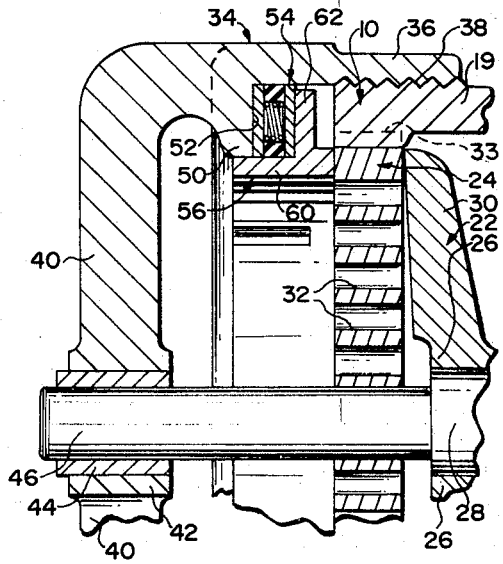
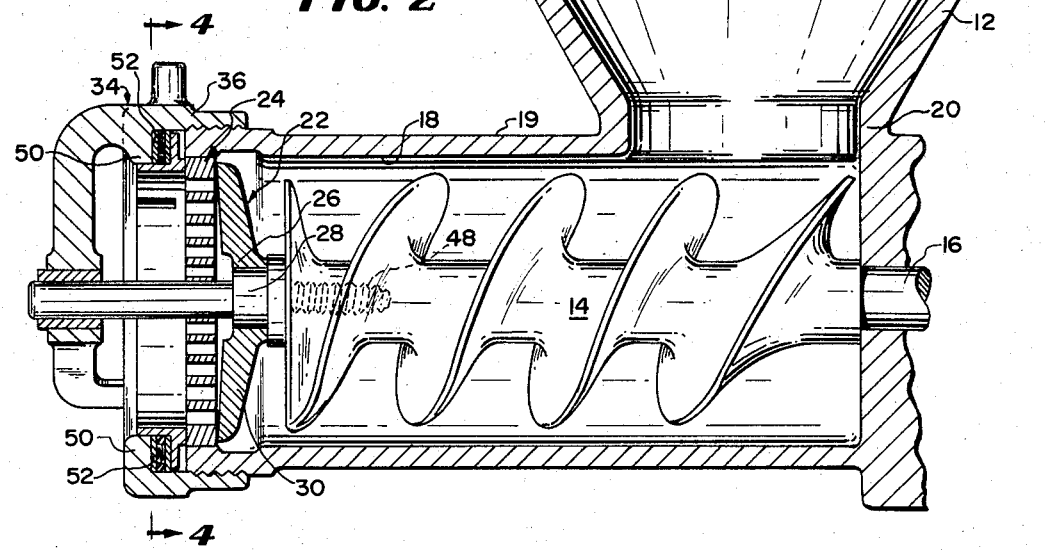

COMPOSITE EXPANSIBLE BIASING AND SEALING GASKET

The present invention relates generally to meat grinders and has particular reference to a novel retainer ring assembly by means of which looseness, resulting from wear between the usual stationary or nonrotatable perforated shear plate and the coacting rotary cutter of a conventional or standard meat grinder, is automatically taken up and compensated for.

The invention is specifically concerned with a conventional meat grinder of the type which includes essentially a funnel-shaped hopper into which chunks or pieces of raw meat or other food products are placed for subsequent feed or transfer by a rotatable worm through the grinder casing to a shear plate and cutter assembly from which the ground meat is forcibly discharged through perforations in the shear plate. Ordinarily, the retainer ring of a conventional meat grinder is threaded onto the open discharge end of the grinder casing so that, when it is tightened to its home or operating position on the grinder casing, it bears directly against the peripheral region of the perforated shear plate and forces the plate against the blades of the rotatable cutter. Obviously, as the shear plate and cutter blades wear due to continued use of the grinder, it becomes necessary to tighten the retainer ring by a proper turning operation in order to maintain the required plate-to-cutter pressure for satisfactory meat grinding. If, as often is the case, wear is not uniform around the periphery of the perforated shear plate, distortion may take place due to repeated excessive tightening of the ring. In some types of meat grinders, a nut on the discharge end of the worm shaft is used to urge the perforated shear plate against the rotatable cutter in order thus to effect proper plate-to-cutter pressure. In such an instance, excessive tightening of the nut exerts a concentrated pressure at the center of the shear plate, thus creating a non-planar condition of the plate with consequent poor shearing taking place between the shear plate and the cutter blades in the peripheral region of the plate.

A further cause of misalignment between the perforated shear plate and the rotatable blade-carrying cutter of a conventional meat grinder involves the use of an outrigger support for the retainer ring, such a support being employed in connection with a number of commercial meat grinders and embodying a bearing stud or pilot shaft which is threaded into the discharge end of the worm shaft, together with a forward spider connection between the retainer ring and the stud. In the operation of such a meat grinder, if the perforated plate undergoes an appreciable amount of wear, bearing misalignment takes place, thus causing the plate and cutter to wobble in unison and thereby produce undesirable results.

The present invention is designed to overcome the above-noted limitations that are attendant upon the construction and use of conventional meat grinders of the various types heretofore set forth and, toward this end, the invention contemplates the provision, in an otherwise conventional meat grinder, of a novel spring-assisted biasing and sealing gasket and pressure ring combination which is effectively interposed between the retainer ring and the stationary, perforated, shear plate of the meat grinder, the gasket being compressible and existing under compression so that it expands and yieldingly forces the perforated shear plate against the blades of the rotatable cutter in a uniform manner and maintains the shearing edges of the cutter blades in perfect linear contact with the adjacent side of the perforated shear plate at all times, thus compensating for any wear that may take place between the plate and the cutter blades. According to the invention, the compressible and expansible gasket is provided with a series of internal compression springs which are relied upon to a large extent to supply a nearly constant expansion factor to the gasket as a whole so that as the gasket expands no appreciable diminution of pressure between the perforated shear plate and the cutter blades will result.

The provision of a meat grinder which embodies the novel compressible and expansible biasing and sealing gasket briefly outlined above, and for the stated purposes, constitutes the principal object of the present invention. Other objects and advantages of the invention, not at this time enumerated, will become readily apparent as the nature of the invention is better understood from a consideration of the following detailed description.

The invention consists in the several novel features which are hereinafter set forth and are more particularly defined by claims at the conclusion hereof.

In the accompanying two sheets of drawings forming a part of this specification, one illustrative embodiment of the invention is disclosed.

In these drawings:

FIG. 1 is a front elevational view of a meat grinder embodying the principles of the present invention, certain parts being broken away and other parts being shown in section in the interests of clarity;

FIG. 2 is a vertical longitudinal sectional view taken on the line 2—2 of FIG. 1;

FIG. 3 is an enlarged sectional view representing a fragmentary portion of the meat grinder structure of FIGS. 1 and 2;

Figure 4:
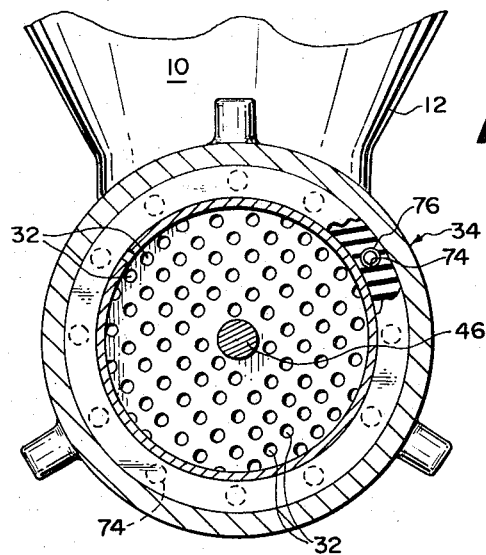
FIG. 4 is a vertical transverse sectional view taken on the line 4—4 of FIG. 2.

Referring now to the drawings in detail, and in particular to FIGS. 1 and 2, the illustrated form of meat grinder which has been selected as a typical environment for the present invention embodies a horizontally elongated, grinder casing 10 having at its receiving end the usual upstanding, funnel-shaped hopper 12 into which chunks or pieces of meat or other food products are placed and then tamped downwardly as a preliminary to horizontal pickup and feed by a horizontally positioned worm 14, the latter being disposed horizontally in and extending lengthwise through the grinder casing 10 and having its receiving end connected fixedly to the inner end of a coaxial, rotatable worm shaft 16 which extends through the end wall at the receiving end of the grinder casing. The worm 14 is operatively disposed within a cylindrical and longitudinally extending meat channel 18 which is formed in a cylindrical section 19 of the casing 10 and communicates with the hopper 12 through a narrow neck portion 20. The worm shaft 16 is adapted to be driven by an electric motor or other power source (not shown), it being understood that the mounting means for the motor and its driving connection with the shaft are conventional and have no relationship to the present invention so that illustration thereof is not deemed to be necessary.

Such meat chunks or pieces as are forced into the confines of the worm 14 are impelled forwardly through the meat channel 18 past a rotatable cutter 22 and against a stationary circular perforated shear plate 24. The cutter includes a hub 26 which is mounted on a square or other non-circular enlargement 28 on the front end portion of the worm 22. The cutter also includes or comprises a series of radially extending blades 30 which cooperate with the adjacent rim regions of a plurality of perforations 32 in the shear plate 24 in shearing small meat fragments from the meat chunks. These meat fragments are forced forwardly through the perforations 32 and are received in a suitable receptacle (not shown) which is positioned under the open front end portion of the meat grinder casing. In order to prevent relative rotation between the shear plate 24 and the grinder casing 10, an interlocking tongue and groove connection 33 (see FIG. 3) is provided between these parts as is conventional in the meat grinder art.

In order to attain uniform plate-to-cutter pressure at all times, a retainer ring 34 is provided and it includes a cylindrical outer section 36 which is threadedly received in telescopic fashion as indicated at 38 over the open forward rim of the cylindrical section 19 of the casing 10. Said retainer ring 34 is provided with a series of three integral, inwardly extending, equidistantly spaced spider-like arms 40 which extend radially inwardly as shown in FIG. 1 and have their inner ends shaped to form a central hub 42 within which there is disposed a bushing 44 for the front end of a horizontal pilot shaft 46, the latter being in coaxial relation with the worm 14 and having an externally threaded rear end 48 which is received in an internally threaded socket in the front end of the worm 14 as shown in dotted lines in FIG. 2.

The cylindrical outer section 36 of the retainer ring 34 is formed at its outer end with an inwardly extending rim flange 50 which defines a rearwardly facing annular shoulder 52, the latter directly opposing the peripheral region of the perforated shear plate 24. The space between the shoulder 52 and the peripheral region of the shear plate 24 establishes an annulus within which there is disposed a pressure ring and biasing gasket combination. The latter constitutes the principal feature of the present invention and includes a composite biasing gasket 54 which bears against the shoulder 52 and effectively transmits rearward thrust against the shear plate 24 through the medium of a pressure ring 56, the latter constituting the second part of the aforesaid combination.

The pressure ring 56 is formed of metal and embodies a cylindrical body portion 60 which has a sliding fit with the aforementioned inwardly extending rim flange 50 of the retainer ring 34. The rear or inner rim of the body portion 60 of the pressure ring 56 engages the peripheral region of the front face of the perforated shear plate 24 as clearly shown in FIG. 3. A radially extending, annular flange 62 projects outwardly from the medial or central region of the body portion 60 of the pressure ring 56 and bridges or defines the rear or inner side of the annular space which is established by the annular shoulder 52 and that portion of the outer periphery of the body portion which is rearwards of the flange 62. The aforementioned biasing gasket 54 is disposed within said annular space.

Figure 5:
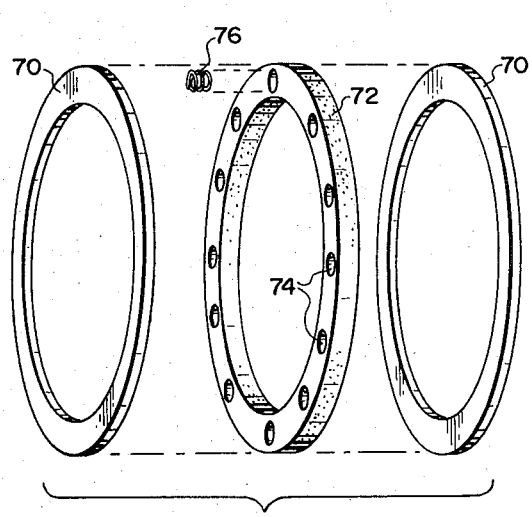
FIG. 5 is an exploded perspective view of the composite biasing and sealing gasket assembly which is employed in connection with and forms the principal part of, the present invention.
Figure 6:
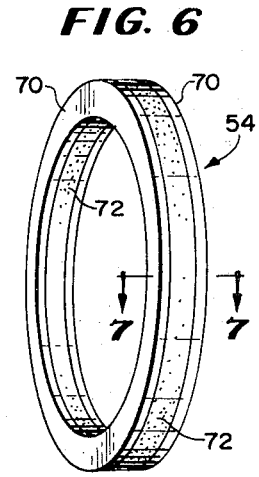
FIG. 6 is a perspective view of the assembled gasket of FIG. 5.

Referring now to FIGS. 3 to 7, inclusive, the composite biasing gasket 54 is in the form of a sandwich-like assembly of three principal parts, together with an annular series of helical compression springs. These principal parts consist of a pair of identical outside rings 70 and an intermediate ring 72 which is sandwiched or disposed between the rings 70. The outside rings 70 of the biasing gasket 54 are relatively rigid and they may be formed of a metal or a suitable plastic material of appreciable hardness and resistance to compressional forces. The ring 72 is of an elastomeric nature and is preferably formed of a suitable neoprene rubber which is compressible but possesses a relatively high compression factor. As best shown in FIGS. 4 and 5 of the drawings, the intermediate ring 72 of the biasing gasket 54 is provided with a plurality of equally and circumferentially spaced eccentrically disposed longitudinal extending bores 74 therethrough. The three rings 70 and 71 are bonded together in face-to-face relationship by a suitable adhesive (not shown) and each of the holes 74 in the intermediate ring 72 has positioned therein a relatively short helical compression spring 76, the ends of which bear outwardly in opposite direction against the opposed inner faces of the comparatively rigid rings 70. The various springs 76 exist under moderate compression so that they exert their spreading influence on the rings 70, tending to stretch the intermediate elastomeric ring 72, at such time as the slightest compressional force is applied to the biasing gasket 54 as a whole.

In assembling the herein described meat grinder, the biasing gasket 56 is first installed within the aforementioned annular space in the vicinity of the rearwardly facing annular shoulder 52 (see FIG. 3) and in surrounding relation with respect to the cylindrical body portion 60 of the pressure ring 56 and, in addition, so that one of the rings 70 bears against the shoulder 52 while the other ring 70 bears against the radially extending annular flange 62 of the pressure ring. The retainer ring 34 is then tightened by rotating the same in a clockwise direction as viewed in FIG. 1 and until a relatively high degree of compressional force is applied to the composite biasing gasket 54 as a whole. This compressional force is reflected by a diminution in the thickness of the elastomeric intermediate ring 72, as well as by an increase in the normal compression to which the various springs 76 are subjected. The spreading action of the gasket 54 will, of course, be exerted against the perforated shear plate 24 at all times during operation of the cutter 22 so that, as wear takes place, it will be compensated for by expansion of the biasing gasket 54.

Figure 8:
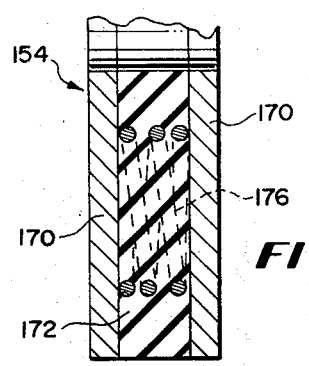
FIG. 8 is a sectional view similar to FIG. 7 but showing a modified form of compressible and expansible biasing and sealing gasket which is capable of use in connection with the invention.
Figure 7:
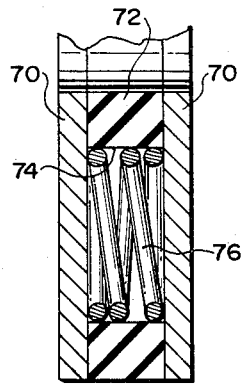
FIG. 7 is an enlarged radial sectional view taken on the line 7—7 of FIG. 6.

In FIG. 8, a slightly modified form of sealing and biasing gasket 154 is disclosed. Due to the similarity between the previously described composite biasing 54 and the gasket 154 and to avoid needless repetition of description, similar reference numerals but of a higher order have been applied to the corresponding parts as between the disclosures of FIGS. 8 and 7.

In the form of biasing gasket shown in FIG. 8, the two outside rings 170 remain the same as the rings 70 of the gasket 54, but the intermediate elastomeric ring 72 is devoid of bore such as the bores 74 and instead is solid. The springs 176 which are employed in connection with the gasket 154 are embedded in the material of the intermediate ring 172 during the molding operation by means of which said intermediate ring is formed. These springs 176 occupy the same relative positions as the springs 76 in the elastomeric intermediate ring 72 of the gasket 54. Otherwise, the gasket 154 remains substantially the same as the gasket 54 and, when operatively employed in connection with a meat grinder, its operation is similar to the operation of the latter gasket.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by letters patent:

1. A seal assembly adapted for positioning between a pair of opposed planar surfaces in order to form a fluid-tight seal therebetween when such assembly is compressed between such surfaces, said seal assembly being of sandwich-like construction and comprising a pair of identical rigid circular outside members, and an intermediate resilient circular member formed of elastomeric material, said intermediate member being formed with a multiplicity of equally and circumferentially spaced eccentrically disposed longitudinally extending bores therein, and a helical compression spring disposed in each of said bores and having its opposite ends bearing directly against said circular outside members, said intermediate member being in coextensive face-to-face contact with each of said circular outside members and being coextensively bonded thereto, said compression springs existing under a slight degree of compression tending to stretch the intermediate member in a longitudinal direction.

2. A seal assembly as set forth in claim 1, wherein each of said outside members and the intermediate member are in the form of flat annular rings.

* * * * *